United States Patent
Hori et al.

(10) Patent No.: US 11,215,970 B2
(45) Date of Patent: Jan. 4, 2022

(54) PROCESSING CONTROL DEVICE, MACHINE TOOL, AND PROCESSING CONTROL METHOD

(71) Applicant: Mitsubishi Electric Corporation, Tokyo (JP)

(72) Inventors: Atsushi Hori, Tokyo (JP); Kentaro Mori, Tokyo (JP); Tomoya Fujita, Tokyo (JP); Goh Sato, Tokyo (JP); Akihiko Imagi, Tokyo (JP); Hiroyasu Negishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 294 days.

(21) Appl. No.: 16/497,151

(22) PCT Filed: Apr. 27, 2017

(86) PCT No.: PCT/JP2017/016775
§ 371 (c)(1),
(2) Date: Sep. 24, 2019

(87) PCT Pub. No.: WO2018/198274
PCT Pub. Date: Nov. 1, 2018

(65) Prior Publication Data
US 2021/0124332 A1  Apr. 29, 2021

(51) Int. Cl.
*G05B 19/4068* (2006.01)
*G05B 19/19* (2006.01)

(52) U.S. Cl.
CPC ......... *G05B 19/4068* (2013.01); *G05B 19/19* (2013.01); *G05B 2219/33305* (2013.01); *G05B 2219/45151* (2013.01)

(58) Field of Classification Search
None
See application file for complete search history.

(56) References Cited

U.S. PATENT DOCUMENTS

| 4,897,586 A | 1/1990 | Nakata et al. |
| 5,277,529 A * | 1/1994 | Anders ................. B23C 5/00 |
| | | 407/53 |

(Continued)

FOREIGN PATENT DOCUMENTS

| CN | 103399525 A | 11/2013 |
| JP | 61-230841 A | 10/1986 |

(Continued)

OTHER PUBLICATIONS

Indian Office Action issued in the counterpart Indian Patent Application No. 201947041212, with an English translation.

*Primary Examiner* — Sean Shechtman
(74) *Attorney, Agent, or Firm* — Birch, Stewart, Kolasch & Birch, LLP

(57) ABSTRACT

A processing control device controls a tool for processing a first workpiece. The processing control device includes a driving unit to drive the tool, an output unit, and a control unit to control the driving unit and the output unit. Processing information obtained by performing preliminary processing on a second workpiece before performing first processing on the first workpiece is transmitted by the control unit to the output unit and accordingly the processing information is outputted from the output unit. The control unit generates a control command for performing second processing that is performed on the first workpiece after the first processing. The control unit controls the driving unit according to the control command.

22 Claims, 10 Drawing Sheets

(56) References Cited

U.S. PATENT DOCUMENTS

| | | | |
|---|---|---|---|
| 9,724,801 | B2 | 8/2017 | Gu |
| 10,650,317 | B2 | 5/2020 | Foerster et al. |
| 2015/0051724 | A1 | 2/2015 | Chang et al. |
| 2016/0209825 | A1* | 7/2016 | Murakawa ......... G05B 19/4068 |
| 2017/0308055 | A1 | 10/2017 | Hoshino et al. |

FOREIGN PATENT DOCUMENTS

| | | |
|---|---|---|
| JP | 7-104829 A | 4/1995 |
| JP | 11-259685 A | 9/1999 |
| JP | 2001-5507 A | 1/2001 |
| JP | 2001-255916 A | 9/2001 |
| JP | 2002-73131 A | 3/2002 |
| JP | 2002-126928 A | 5/2002 |
| JP | 2010-144773 A | 7/2010 |
| JP | 2010-182210 A | 8/2010 |
| JP | 2013-66956 A | 4/2013 |
| JP | 2015-1468 A | 1/2015 |
| TW | 201521940 A | 6/2015 |

\* cited by examiner

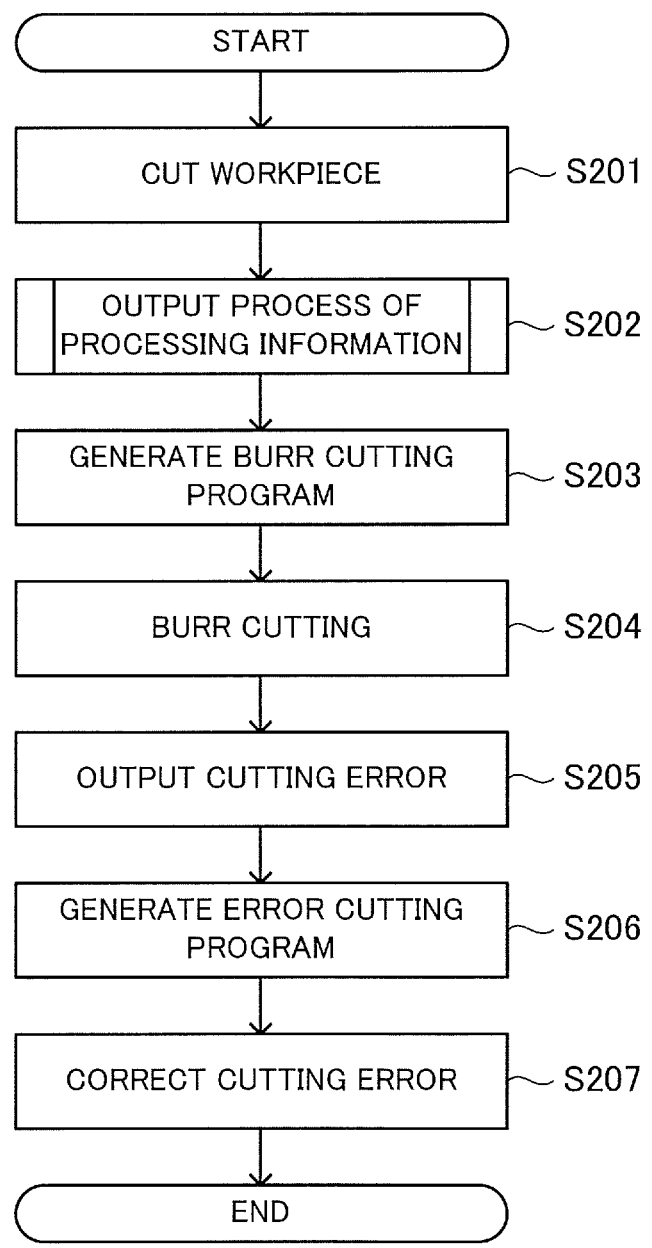

PROCESSING CONTROL DEVICE, MACHINE TOOL, AND PROCESSING CONTROL METHOD

TECHNICAL FIELD

The present invention relates to a processing control device, a machine tool and a processing control method.

BACKGROUND ART

A machine tool for processing a workpiece (e.g., metallic material) that is a processing object by driving a tool is generally used. When a cutting tool is used as the tool, for example, burrs occur due to the cutting processing, and thus there has been proposed a method for inhibiting the occurrence of burrs (see Patent Reference 1, for example). Further, there has been proposed a method of extracting deburring positions through a simulation regarding the workpiece that is the processing object and displaying the deburring positions on a display unit (see Patent Reference 2, for example).

PRIOR ART REFERENCE

Patent Reference

Patent Reference 1: Japanese Patent Application Publication No. 2013-66956
Patent Reference 2: Japanese Patent Application Publication No. 2010-182210

SUMMARY OF THE INVENTION

Problem to be Solved by the Invention

However, in conventional technologies, processing information based on condition of a preliminarily processed workpiece is not presented to a user, and thus there is a problem in that working efficiency is lowered.

An object of the present invention, which has been made to resolve the above-described problem, is to increase working efficiency by presenting processing information based on condition of a preliminarily processed workpiece to be easily recognizable to a user.

Means for Solving the Problem

A processing control device according to an aspect of the present invention is a processing control device to control a tool. The processing control device includes a driving device to drive the tool according to a control command, an output device, a controller to control the driving device and the output device, and an input device for inputting the control command. After preliminary cutting that is cutting processing to be performed on a workpiece on a basis of a preliminary cutting program as the control command is performed before regular cutting processing, the controller generates processing information including a burr position expected to occur on a workpiece in the regular cutting processing, on a basis of stress that occurs when the tool driven by the driving device touches the workpiece cut on a basis of the preliminary cutting program. When a cutting program as the control command for performing the regular cutting processing is inputted from the input device, the controller controls the driving device on a basis of the cutting program. When the controller determines that the regular cutting processing based on the cutting program is completed, the controller transmits the processing information to the output device and accordingly the processing information is outputted from the output device so as to be referred by a user. When a burr cutting program as the control command for performing burr cutting on a workpiece cut according to the cutting program is inputted from the input device by the user according to the processing information outputted from the output device, the controller controls the driving device according to the burr cutting program.

A processing control device according to another aspect of the present invention is a processing control device to control a tool. The processing control device includes a driving device to drive the tool according to a control command, an output device, a controller to control the driving device and the output device, and an input device for inputting the control command. After preliminary cutting that is cutting processing to be performed on a workpiece on a basis of a preliminary cutting program as the control command is performed before regular cutting processing, the controller generates processing information including a cutting error expected to occur on a workpiece in the regular cutting processing, on a basis of stress that occurs when the tool driven by the driving device touches the workpiece cut on a basis of the preliminary cutting program. When a cutting program as the control command for performing the regular cutting processing is inputted from the input device, the controller controls the driving device on a basis of the cutting program. When the controller determines that the regular cutting processing based on the cutting program is completed, the controller transmits the processing information to the output device and accordingly the processing information is outputted from the output device so as to be referred by a user. When an error cutting program as the control command for performing cutting processing for correcting the cutting error on a workpiece cut according to the cutting program is inputted from the input device by the user according to the processing information outputted from the output device, the controller controls the driving device according to the error cutting program.

Effect of the Invention

According to the present invention, the working efficiency can be increased by presenting the processing information based on the condition of the preliminarily processed workpiece to be easily recognizable to the user.

BRIEF DESCRIPTION OF THE DRAWINGS

FIG. 6 is a flowchart showing an example of a cutting process in the machine tool.

MODE FOR CARRYING OUT THE INVENTION

First Embodiment

Figure 1:
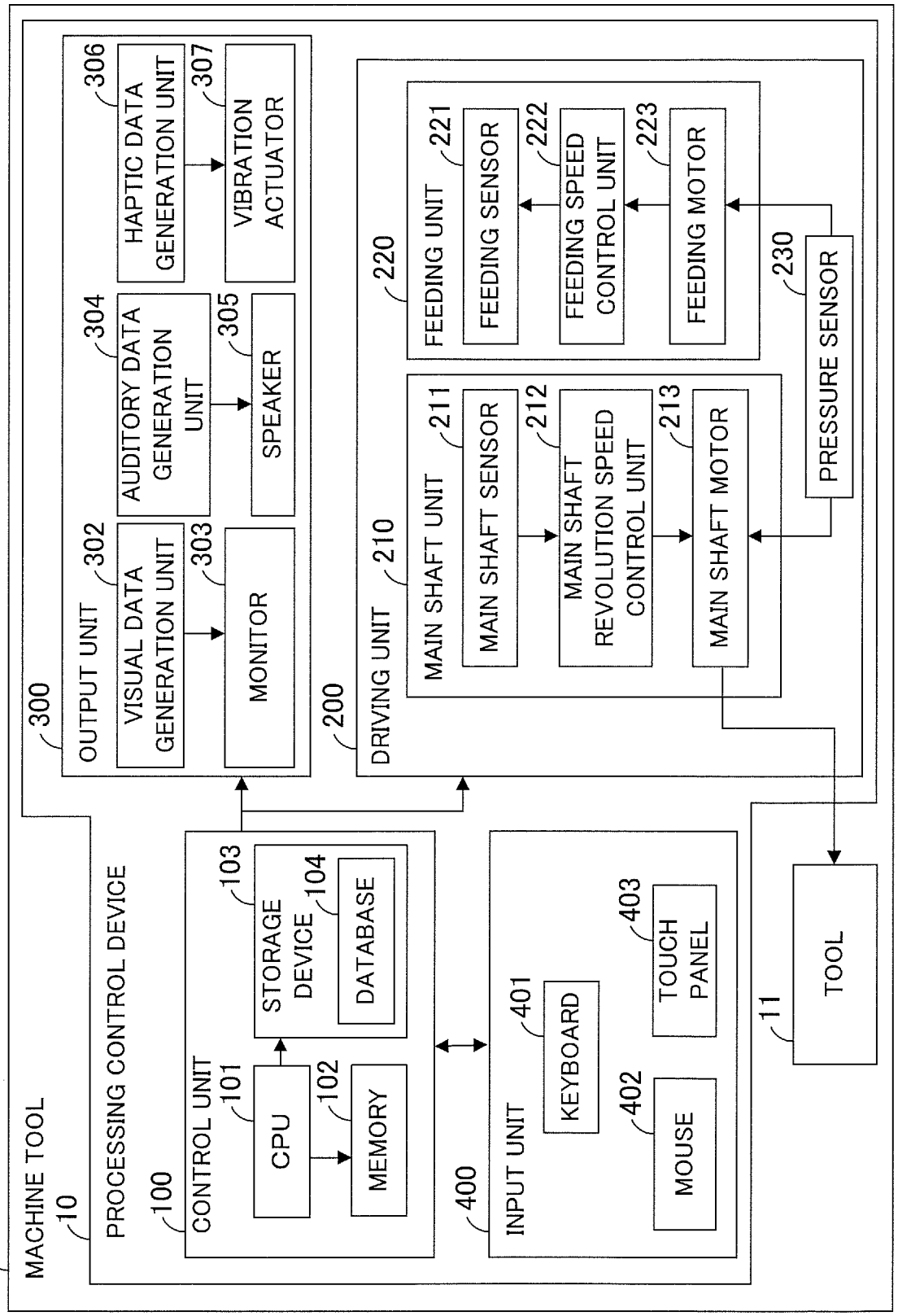
FIG. 1 is a block diagram schematically showing a configuration of a machine tool including a processing control device according to a first embodiment of the present invention.

FIG. 1 is a block diagram schematically showing a configuration of a machine tool 1 including a processing control device 10 according to a first embodiment of the present invention.

The machine tool 1 includes a tool 11 and the processing control device 10 that controls the tool 11. However, the configuration of the machine tool 1 is not limited to the example shown in FIG. 1. In this embodiment, the machine tool 1 is a numerical control (NC) machine tool.

The tool 11 is, for example, a cutting tool for processing a workpiece or a touch probe for detecting the condition of the workpiece such as the position and the shape of the workpiece.

The processing control device 10 includes a driving unit 200 that drives the tool 11, an output unit 300, a control unit 100 that controls the driving unit 200 and the output unit 300, and an input unit 400 for inputting control commands to the control unit 100. However, the configuration of the processing control device 10 is not limited to the example shown in FIG. 1. For example, the output unit 300 and the input unit 400 may be provided outside the processing control device 10 or outside the machine tool 1. The processing control device 10 is an NC device, for example.

The control unit 100 includes a central processing unit (CPU) 101, a memory 102 and a storage device 103. The storage device 103 includes a database 104.

Figure 2:
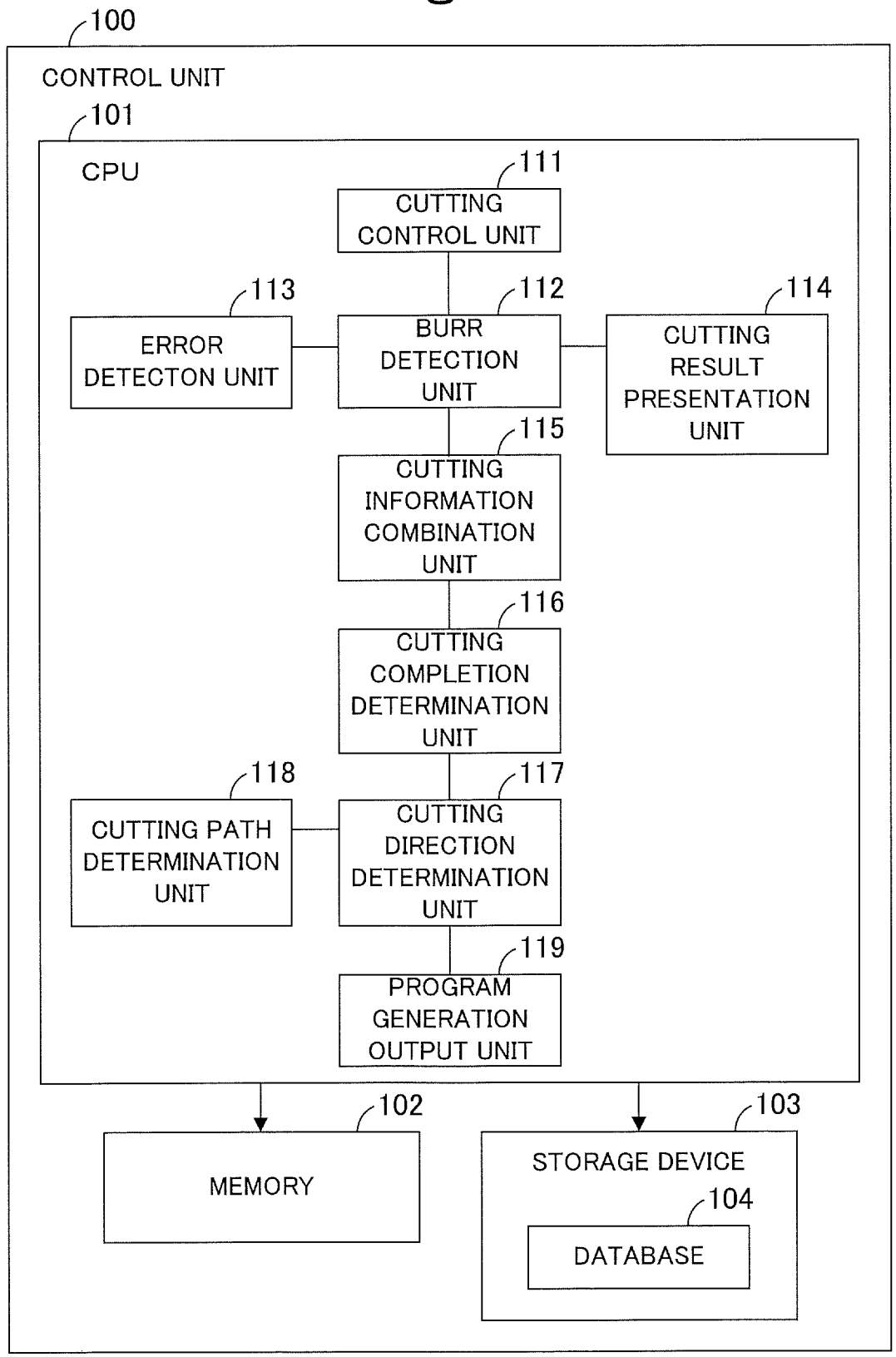
FIG. 2 is a block diagram showing an example of a specific configuration of a control unit.

FIG. 2 is a block diagram showing an example of a specific configuration of the control unit 100.

As shown in FIG. 2, the control unit 100 includes a cutting control unit 111, a burr detection unit 112, an error detection unit 113, a cutting result presentation unit 114, a cutting information combination unit 115, a cutting completion determination unit 116, a cutting direction determination unit 117, a cutting path determination unit 118 and a program generation output unit 119, for example. Functions of these components are implemented by the CPU 101.

The CPU 101 performs computation regarding output content to be outputted from the output unit 300, the contents of control of the driving unit 200, and input content inputted from the input unit 400 to the control unit 100. Further, the CPU 101 reads out a control program for controlling the driving unit 200 and the output unit 300 stored in the memory 102 or the storage device 103 and outputs control signals according to the control program.

The storage device 103 includes the database 104 for storing various types of information.

The driving unit 200 includes a main shaft unit 210, a feeding unit 220 and a pressure sensor 230.

The main shaft unit 210 includes a main shaft sensor 211, a main shaft revolution speed control unit 212 and a main shaft motor 213. The main shaft motor 213 rotates a main shaft to which the tool 11 has been attached. The main shaft revolution speed control unit 212 controls revolution speed of the main shaft. The main shaft sensor 211 detects the revolution speed of the main shaft and transmits the result of the detection to the main shaft revolution speed control unit 212.

The feeding unit 220 includes a feeding sensor 221, a feeding speed control unit 222 and a feeding motor 223. The feeding motor 223 moves the tool 11 in a feeding direction. The feeding speed control unit 222 controls feeding speed of the tool 11. The feeding sensor 221 detects the feeding speed of the tool 11 and transmits the result of the detection to the feeding speed control unit 222.

The pressure sensor 230 detects pressure applied to the tool 11 (specifically, the main shaft to which the tool 11 has been attached).

The output unit 300 includes a visual data generation unit 302, a monitor 303, an auditory data generation unit 304, a speaker 305, a haptic data generation unit 306 and a vibration actuator 307.

The visual data generation unit 302 outputs an image as visual information (referred to also as "visual data") to the monitor 303 according to a command from the control unit 100. The auditory data generation unit 304 outputs audio as auditory information (referred to also as "auditory data") to the speaker 305 according to a command from the control unit 100. The haptic data generation unit 306 outputs vibration as haptic information (referred to also as "haptic data") to the vibration actuator 307 according to a command from the control unit 100.

The input unit 400 includes a keyboard 401, a mouse 402 and a touch panel 403. The user operates the processing control device 10 by using the keyboard 401, the mouse 402 or the touch panel 403 and inputs control commands for the processing control device 10 to the control unit 100 through the input unit 400. The components of the input unit 400 are not limited to the keyboard 401, the mouse 402 and the touch panel 403. For example, the input unit 400 may include a touch pad, a joystick or a dial.

Next, a preliminary process in the machine tool 1 (a processing control method in the processing control device 10) will be described.

Figure 3:
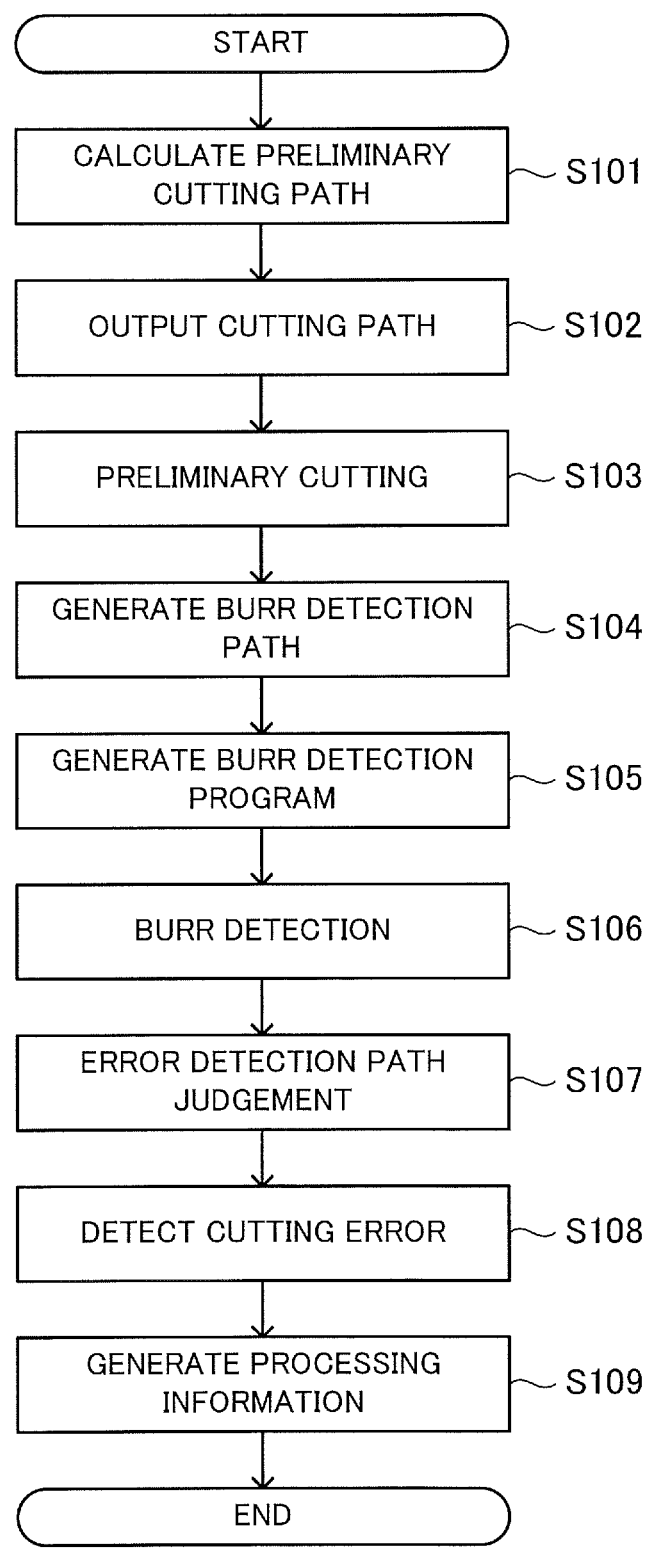
FIG. 3 is a flowchart showing an example of a preliminary process in the machine tool.

FIG. 3 is a flowchart showing an example of the preliminary process in the machine tool 1.

In step S101, the control unit 100 (specifically, the cutting control unit 111) calculates a cutting path (referred to also as a "preliminary cutting path"). Specifically, the cutting control unit 111 reads out a preliminary cutting program as a predetermined control command for performing preliminary cutting as preliminary processing (referred to also as a "preliminary cutting procedure document") from the database 104 and calculates the whole cutting path indicated by the preliminary cutting program (referred to also as a "preliminary cutting path"). The preliminary cutting program is code used as an NC program or a part of an NC program.

The preliminary processing is processing that is preliminarily performed before regular processing is performed. The preliminary cutting is cutting processing that is preliminarily performed before regular cutting processing is performed.

The calculation result (i.e., the cutting path) is outputted from the output unit 300 (step S102). In this embodiment, the calculation result is displayed on the monitor 303.

Figure 4A:
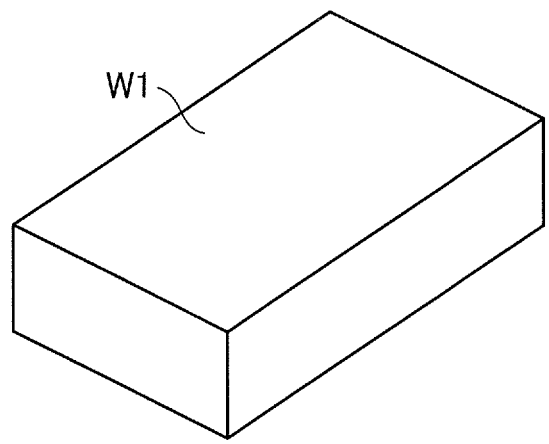
FIGS. 4a to 4c are diagrams showing an example of steps of a preliminary cutting process.
Figure 4B:
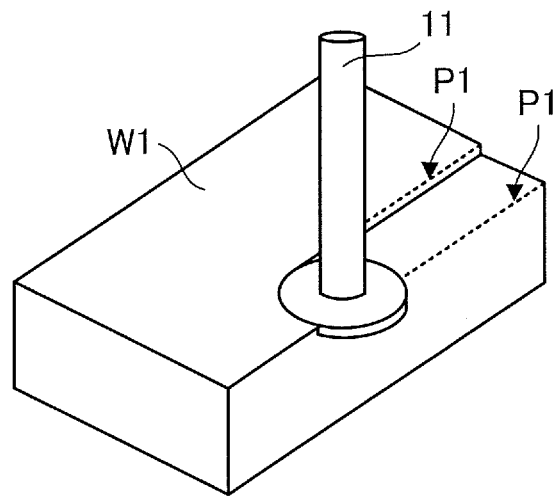
Figure 4C:
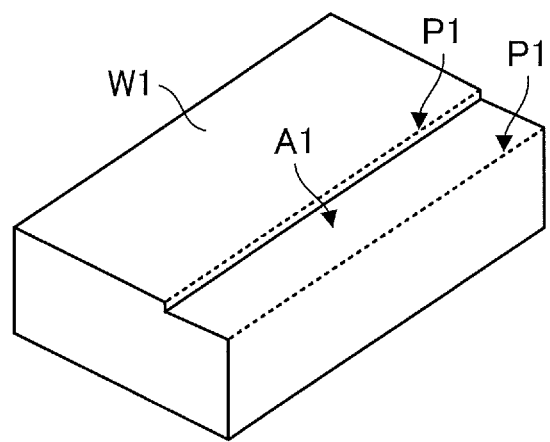

FIGS. 4*a* to 4*c* are diagrams showing an example of steps of a preliminary cutting process.

In step S103, the user of the machine tool 1 performs the preliminary cutting on a workpiece W1 that is the processing object according to the preliminary cutting program displayed on the monitor 303. For example, the user inputs the contents of the preliminary cutting program to the processing control device 10 by using the input unit 400 and thereby controls the tool 11 (specifically, a cutting tool). The preliminary cutting is carried out as above. Broken lines shown in FIGS. 4*b* and 4*c* represent information indicating burr positions that are expected to occur on the workpiece W1 due to the cutting (hereinafter referred to as "burr occurrence expectation position P1"). A cut region A1 shown in FIG. 4*c* represents a region cut by the tool 11.

Figure 5A:
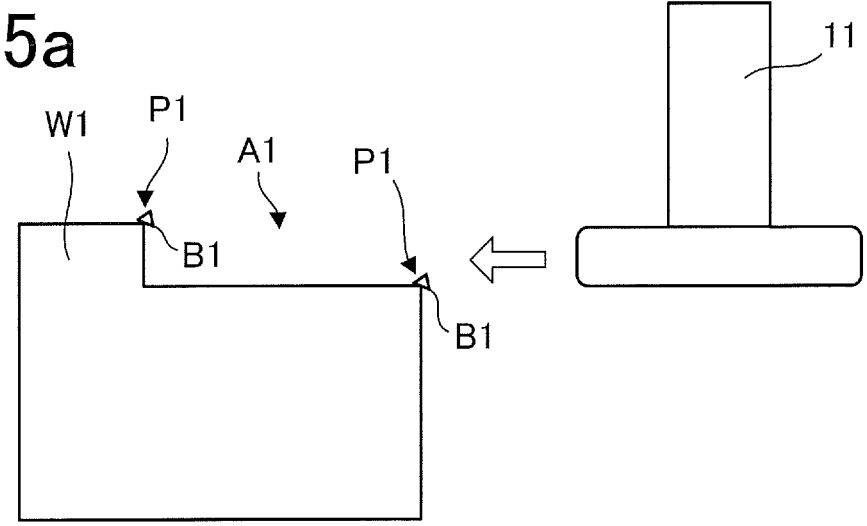
FIGS. 5a to 5c are diagrams showing an example of a burr detection path generation step.
Figure 5B:
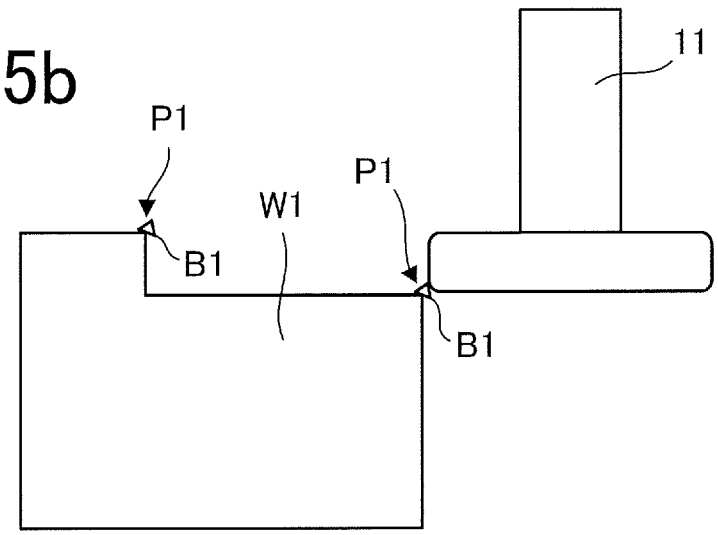
Figure 5C:
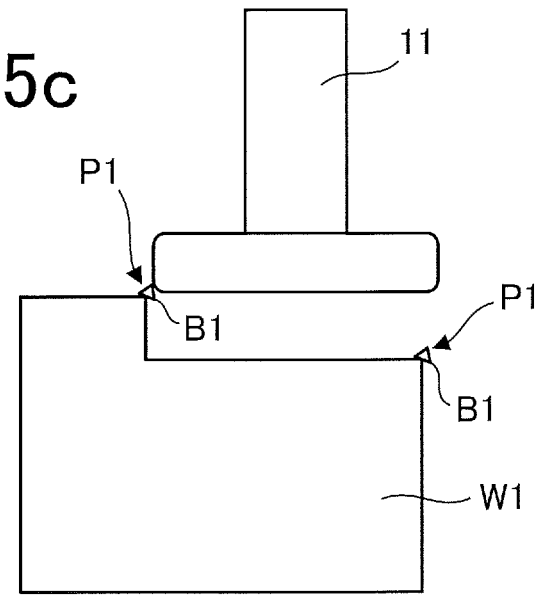

FIGS. 5*a* to 5*c* are diagrams showing an example of a burr detection path generation step.

In step S104, a burr detection path is generated. For example, as shown in FIG. 5*a*, the user brings the tool 11 close to the cut region A1 by controlling the driving unit 200. When the tool 11 touches a burr B1 as shown in FIGS. 5*b* and 5*c*, the control unit 100 (specifically, the burr detection unit 112) measures stress occurring in the tool 11 via the main shaft sensor 211 of the main shaft unit 210 and the feeding sensor 221 of the feeding unit 220. The control unit 100 (specifically, the burr detection unit 112) generates the burr detection path, as a movement path of the tool 11 for performing the burr detection, on the basis of the stress.

The burr detection path is, for example, two-dimensional or three-dimensional coordinate data representing the burr occurrence expectation position P1.

The control unit 100 (specifically, the program generation output unit 119) generates a burr detection program (referred to also as a "burr detection procedure document") as a control command for detecting burrs B1 on the basis of the burr detection path obtained in the step S104. The burr detection program transmitted to the output unit 300 is displayed on the monitor 303 by the visual data generation unit 302 (step S105). The burr detection program is code used as an NC program or a part of an NC program.

In step S106, the user performs the burr detection according to the burr detection program outputted to the monitor 303. Specifically, the user inputs the contents of the burr detection program to the processing control device 10 by using the input unit 400 and thereby controls the tool 11. The burr detection is carried out as above. Burr information B3, including at least one of a burr position B2 obtained by the burr detection or the burr occurrence expectation position P1, is stored in the database 104 of the storage device 103.

In step S107, an error detection path judgment is made. Specifically, the contents of an error detection program (referred to also as an "error detection procedure document") as a predetermined control command are displayed on the monitor 303 and the user judges whether or not there is no problem in the contents of the error detection program (e.g., an error detection path). The error detection program is code used as an NC program or a part of an NC program. If there is no problem in the contents of the error detection program, the user replaces the cutting tool as the tool 11 with the touch probe and inputs the contents of the error detection program to the processing control device 10.

In step S108, similarly to the example shown in FIGS. 5*a* to 5*c*, the user brings the tool 11 close to the cut region A1 of the workpiece by controlling the driving unit 200. Similarly to the process in the step S104 (generation of the burr detection path), when the tool 11 touches the workpiece W1, the control unit 100 (specifically, the error detection unit 113) measures stress occurring in the tool 11 via the main shaft sensor 211 of the main shaft unit 210 and the feeding sensor 221 of the feeding unit, 220. The control unit 100 (specifically, the error detection unit 113) detects a cutting error, as an error with respect to the cutting path indicated by the preliminary cutting program (i.e., the preliminary cutting path), on the basis of the stress. This cutting error is information indicating a cutting error that is expected to occur on the workpiece W1 in processing in step S201 which will be described later. This cutting error is stored in the database 104.

In step S109, the control unit 100 (specifically, the cutting information combination unit 115) generates processing information including at least one of a cutting program (referred to also as a "cutting procedure document") as a predetermined control command, the burr information B3, or the cutting error. The cutting program is code used as an NC program or a part of an NC program. The user replaces the touch probe as the tool 11 with the cutting tool. The control unit 100 (specifically, the cutting information combination unit 115) stores the processing information in the database 104 of the storage device 103. The control unit 100 may also store various types of information other than the burr information B3 or the cutting error in the database 104.

Next, a cutting process in the machine tool 1 (a processing control method in the processing control device 10) will be described.

FIG. 6 is a flowchart showing an example of the cutting process in the machine tool 1.

Figure 7A:
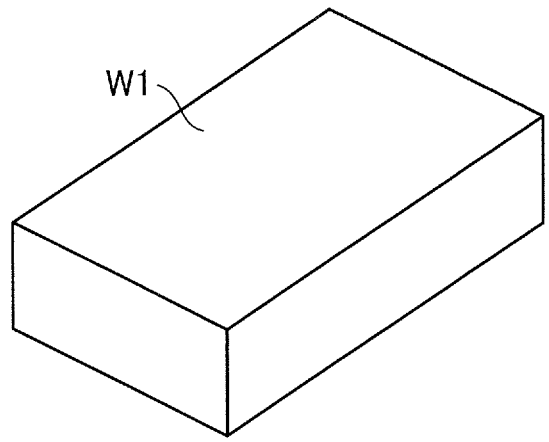
FIGS. 7a to 7c are diagrams showing an example of steps of the cutting process.
Figure 7B:
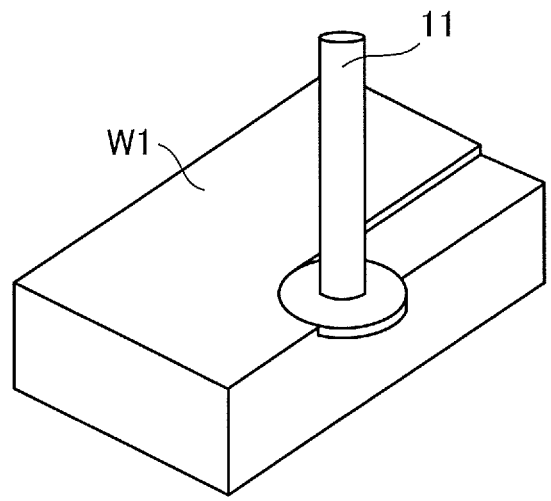
Figure 7C:
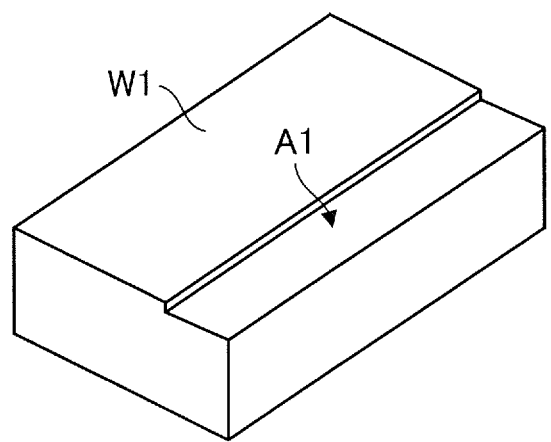

FIGS. 7*a* to 7*c* are diagrams showing an example of steps of the cutting process.

Figure 8A:
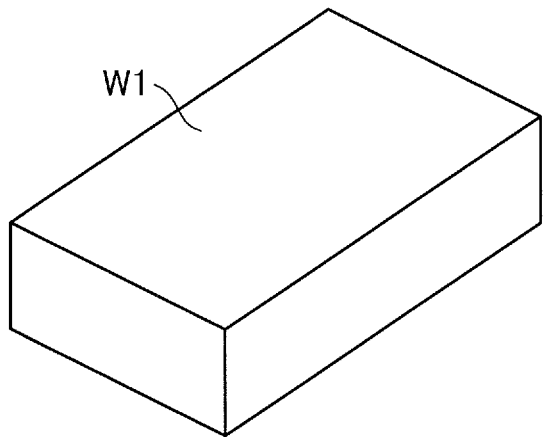
FIGS. 8a to 8c are diagrams showing another example of steps of the cutting process.
Figure 8B:
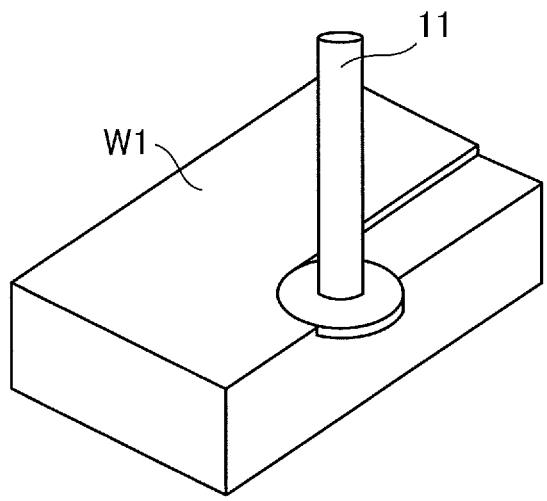
Figure 8C:
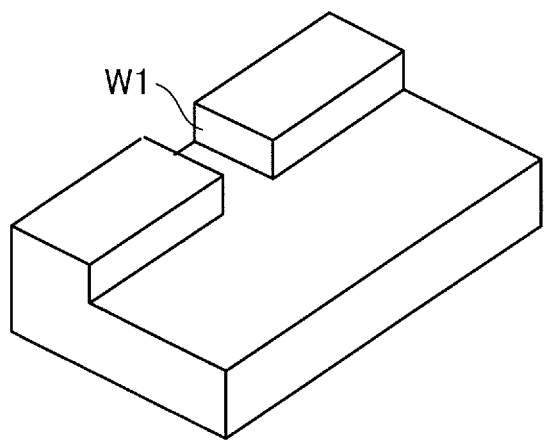

FIGS. 8*a* to 8*c* are diagrams showing another example of steps of the cutting process.

In step S201, the user performs processing (first processing), specifically, cutting processing, on the workpiece W1 by using the processing information obtained in the preliminary process (step S109). Specifically, the user inputs the contents of the cutting program to the processing control device 10 by using the input unit 400 and thereby controls the tool 11 (specifically, the cutting tool). Accordingly, the cutting is carried out as shown in FIGS. 7*a* to 7*c* or FIGS. 8*a* to 8*c*.

Before the processing in the step S201 is performed, the control unit 100 may transmit the processing information obtained in the preliminary process (step S109) to the output unit 300 so that the processing information is outputted from the output unit 300. In this case, the user can perform the processing in the step S201 while referring to the processing information obtained by the preliminary cutting. Further, before the processing in the step S201 is performed, the cutting program may be corrected on the basis of the processing information obtained by the preliminary cutting.

While the processing in the step S103 is referred to as the "preliminary processing", the processing in the step S201 is referred to also as "regular processing" or "normal processing". When the workpiece W1 used in the step S201 is referred to as "first workpiece", the workpiece W1 used in the preliminary process is referred to also as "second workpiece".

Figure 9:
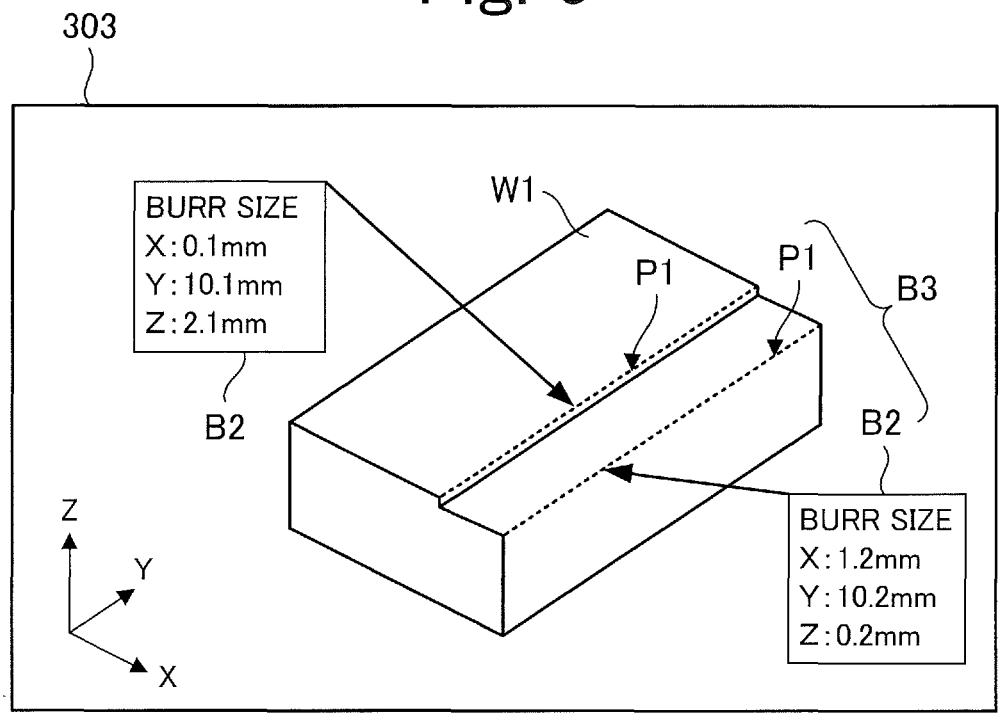
FIG. 9 is a diagram showing an example of a monitor screen displaying processing information obtained by the preliminary process and the cutting process shown in FIG. 7.

FIG. 9 is a diagram showing an example of a monitor screen displaying the processing information obtained by the preliminary process and the cutting process shown in FIG. 7.

Figure 10:
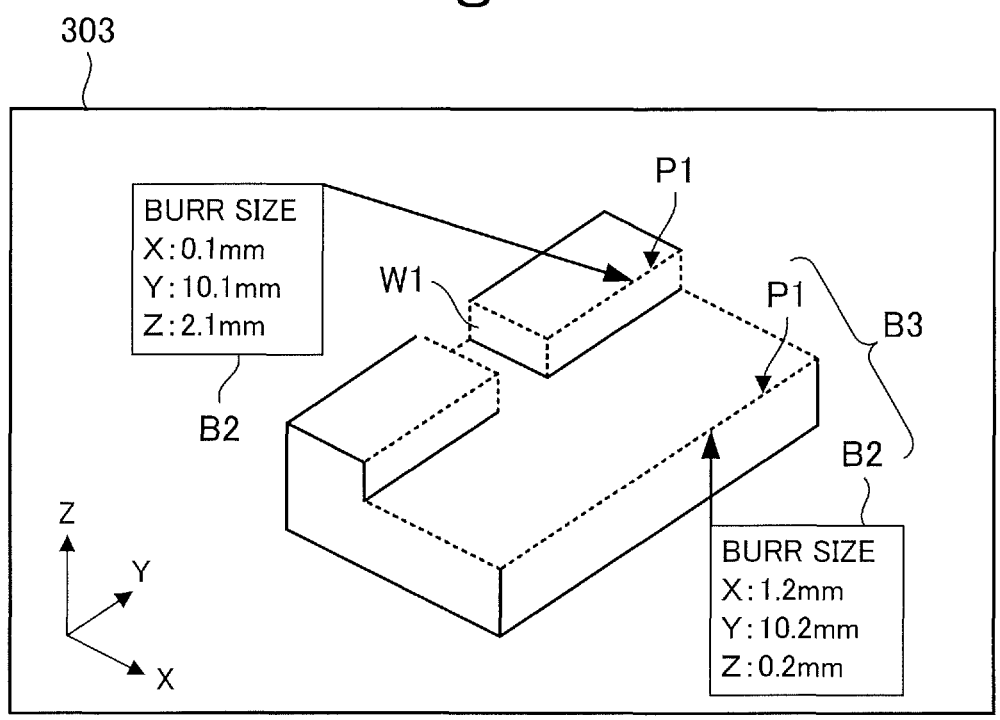
FIG. 10 is a diagram showing an example of a monitor screen displaying processing information obtained by the preliminary process and the cutting process shown in FIG. 8.

FIG. 10 is a diagram showing an example of a monitor screen displaying the processing information obtained by the preliminary process and the cutting process shown in FIG. 8.

In step S202, an output process of the processing information is performed. When the control unit 100 (specifically, the cutting completion determination unit 116) determines that the processing in the step S201 is completed, the control unit 100 (specifically, the cutting result presentation unit 114) transmits processing information to the output unit 300 (step S202). The processing information transmitted by the control unit 100 to the output unit 300 is information including the processing information obtained by performing the preliminary processing on the second workpiece (step S103) before performing the processing on the first workpiece in the step S201 (namely, the information including at least one of the burr information B3 or the cutting error) and an image (specifically, image data) of the workpiece W1 or the like. The processing information transmitted to the output unit 300 is outputted from the output unit 300.

The image (image data) of the workpiece W1 or the like may be either an image previously stored in the database 104 or an image captured by using a camera or the like after the processing in the step S201 (i.e., an image of the workpiece W1 obtained by performing the processing in the step S201).

The control unit 100 transmits the processing information to the output unit 300 (specifically, the visual data generation unit 302 and the monitor 303) and accordingly the processing information including the image of the workpiece W1 or the like and the burr information B3 is displayed on the monitor 303 as shown in FIG. 9 and FIG. 10. By referring to the image of the workpiece W1 or the like and the burr information B3 displayed on the monitor 303, the user can intuitively grasp a region that should be paid attention to when performing processing after the step S202.

A concrete example of the process in the step S202 will be described.

Figure 12:
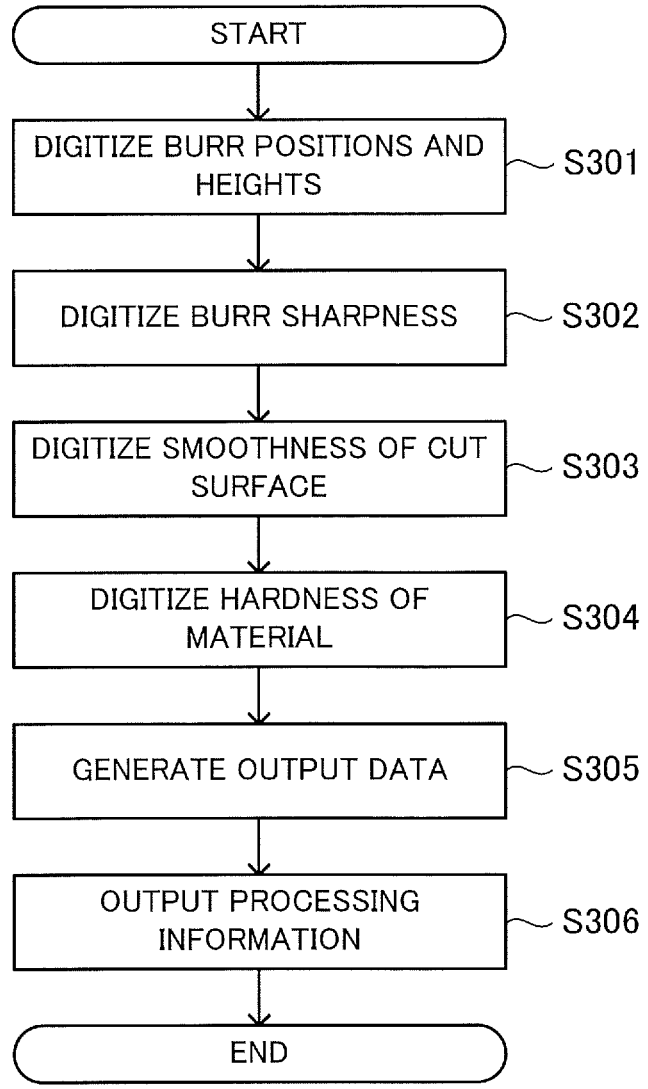
FIG. 12 is a flowchart showing an example of an output process of the processing information.

FIG. 12 is a flowchart showing an example of the output process of the processing information in the step S202.

In step S301, the control unit 100 (specifically, the burr detection unit 112) digitizes the burr positions B2 and burr heights that are information stored in the database 104.

In step S302, the control unit 100 (specifically, the burr detection unit 112) digitizes burr sharpness that is information stored in the database 104.

In step S303, the control unit 100 (specifically, the burr detection unit 112) digitizes smoothness of a cut surface of the workpiece W1 that is information stored in the database 104.

In step S304, the control unit 100 (specifically, the burr detection unit 112) digitizes hardness of the material of the workpiece W1 that is information stored in the database 104.

In step S305, the control unit 100 (specifically, the cutting result presentation unit 114) generates the visual data (e.g., the image of the workpiece W1 or the like) that is the output data to be outputted from the output unit 300.

In step S306, the control unit 100 (specifically, the cutting result presentation unit 114) transmits the data generated in the steps S301 to S305 to the output unit 300 as the processing information.

Figure 11:
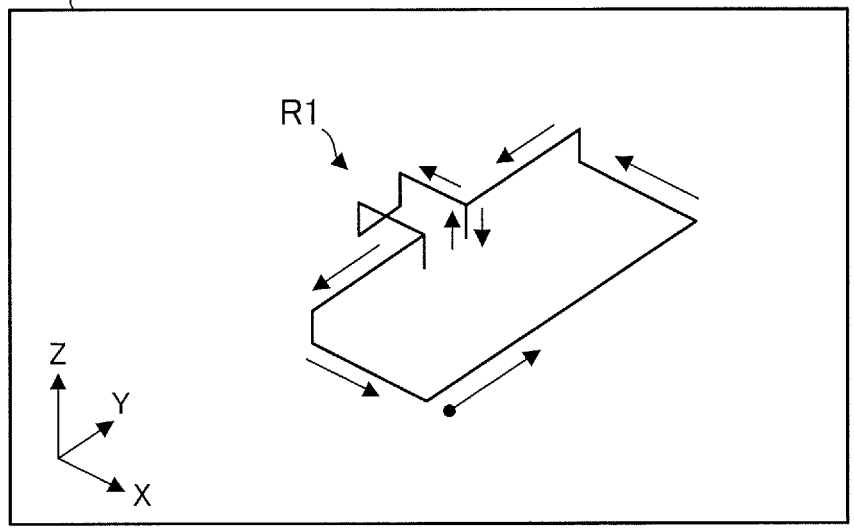
FIG. 11 is a diagram showing an example of a monitor screen displaying a cutting path in the cutting process shown in FIG. 8.

FIG. 11 is a diagram showing an example of a screen on the monitor 303 displaying a cutting path R1 in the cutting process shown in FIG. 8.

In the step S202, information such as the cutting path R1 in the cutting process may be displayed on the output unit 300.

In step S203, the control unit 100 (specifically, the program generation output unit 119) generates a burr cutting program (referred to also as a burr cutting procedure document) as a control command for performing burr cutting (i.e., a second processing performed after the first processing in the step S201) on the workpiece W1. The burr cutting program is code used as an NC program or a part of an NC program. A cutting path of the tool 11 and cutting directions with respect to the workpiece W1 for performing the burr cutting may be respectively generated by the cutting path determination unit 118 and the cutting direction determination unit 117, for example.

In step S204, the user performs processing (second processing) on the workpiece W1, specifically, deburring (referred to also as "burr cutting"), according to the burr cutting program. Specifically, the burr cutting program is displayed on the output unit 300 (specifically, the monitor 303), and the user inputs the contents of the burr cutting program to the processing control device 10 by using the input unit 400 and thereby controls the tool 11 (specifically, the cutting tool). The control unit 100 (specifically, the cutting control unit 111) controls the driving unit 200 according to the burr cutting program as a control command inputted from the input unit 400. The burr cutting is carried out as above. The processing in the step S204 is referred to also as "finish processing".

In step S205, the cutting error as an item of information included in the processing information obtained by the preliminary process (step S108) is presented to the user. Specifically, the control unit 100 (specifically, the cutting result presentation unit 114) transmits the cutting error to the output unit 300. The cutting error transmitted to the output unit 300 is displayed on the monitor 303 by the visual data generation unit 302. However, it is also possible to display the cutting error on the monitor 303 in the step S202.

In step S206, the control unit 100 (the program generation output unit 119) generates an error cutting program (referred to also as an error cutting procedure document) as a control command for performing cutting processing for correcting the cutting error (i.e., processing performed after the first processing in the step S201) on the workpiece W1. The error cutting program is code used as an NC program or a part of an NC program. A cutting path of the tool 11 and cutting directions with respect to the workpiece W1 for performing the cutting processing in the step S207 may be respectively generated by the cutting path determination unit 118 and the cutting direction determination unit 117, for example.

In step S207, the user performs cutting processing for correcting the cutting error according to the error cutting program obtained in the step S206. Specifically, the error cutting program is displayed on the output unit 300 (specifically, the monitor 303), and the user inputs the contents of the error cutting program to the processing control device 10 by using the input unit 400 and thereby controls the tool 11 (specifically, the cutting tool). The control unit 100 (specifically, the cutting control unit 111) controls the driving unit 200 according to the error cutting program as a control command inputted from the input unit 400. Accordingly, the cutting error is corrected. The processing in the step S207 is referred to also as "finish processing".

By performing the process from the step S201 to the step S207, the cutting process in the machine tool 1 is completed.

According to the first embodiment, the processing information based on the condition of the preliminarily processed workpiece W1 (the processing information including information such as the burr information B3 and the cutting error obtained by performing the preliminary cutting) can be visually presented to be easily recognizable to the user. Accordingly, the user can intuitively grasp the region that should be paid attention to when performing the processing, and the working efficiency can be increased.

Second Embodiment

While the machine tool 1 in the first embodiment presents the processing information such as the burr information B3 and the cutting error obtained by performing the preliminary cutting to the user as visual information, it is also possible to present the processing information such as the burr information B3 and the cutting error obtained by performing the preliminary cutting to the user as auditory information or haptic information.

In the case where the information obtained by performing the preliminary cutting is presented to the user as auditory information, the auditory data generation unit 304 of the output unit 300 converts the processing information such as the burr information B3 and the cutting error obtained by performing the preliminary cutting into audio and outputs the audio to the speaker 305. Accordingly, the user can recognize the information obtained by performing the preliminary cutting by means of audio and intuitively grasp the region that should be paid attention to when performing the processing, and the working efficiency can be increased.

In the case where the information obtained by performing the preliminary cutting is presented to the user as haptic information, the haptic data generation unit 306 of the output unit 300 converts the processing information such as the burr information B3 and the cutting error obtained by performing the preliminary cutting into vibration data and outputs the vibration data to the vibration actuator 307. Since the user can recognize the information obtained by performing the preliminary cutting by means of vibration, the user can intuitively grasp the region that should be paid attention to when performing the processing, and the working efficiency can be increased.

The information obtained by performing the preliminary cutting may be presented to the user not only with one output method but with a variety of combination of visual information, auditory information and haptic information. In this case, the output unit 300 includes at least one of the monitor 303, the speaker 305, or the vibration actuator 307, and the processing information is outputted from at least one of the monitor 303, the speaker 305, or the vibration actuator 307. Accordingly, the user can grasp the information obtained by performing the preliminary cutting more intuitively by means of various methods like visual, auditory and haptic methods, and the working efficiency can be increased.

Third Embodiment

While the burr information B3 and the cutting error presented to the user when the cutting process is performed are information obtained by the preliminary cutting in the machine tool 1 in the first embodiment, it is also possible to configure the machine tool 1 to present processing information obtained by past preliminary cutting and accumulated in the database 104 to the user.

In this case, the processing information to be presented to the user (i.e., the processing information to be outputted from the output unit 300) has previously been stored in the storage device 103 (e.g., the database 104). When the cutting process is performed, the control unit 100 transmits the processing information to the output unit 300 so that information stored in the storage device 103 is outputted from the output unit 300. It is also possible to store information other than the burr information B3 or the cutting error in the storage device 103 as information to be presented to the user.

For example, when the user performs the cutting process, the user inputs a control command to the control unit 100 through the input unit 400 so that information stored in the storage device 103 is outputted from the output unit 300 on the basis of the type of the workpiece W1 and the type of the cutting tool. The user can select necessary information from the information stored in the storage device 103 on the basis of the type of the workpiece W1 and the type of the cutting tool. Consequently, the user can intuitively grasp the region that should be paid attention to when performing the processing, and the working efficiency can be increased.

Cutting data obtained by performing the cutting process is stored in the storage device 103.

Information stored in the storage device 103 may be outputted from the output unit 300 automatically with no control command from the user. In this case, the user checks the condition of the workpiece W1 such as the position and the shape of the workpiece W1 by using the tool 11 such as the touch probe, and the control unit 100 transmits information in the storage device 103 to the output unit 300 on the basis of the result of the check.

In the case where the preliminary cutting has been performed, information obtained by performing the preliminary cutting may be outputted from the output unit 300.

Further, information stored in the storage device 103 may be outputted from the output unit 300 not only with one output method but with a variety of combination of visual information, auditory information and haptic information. Accordingly, the user can grasp the information obtained by performing the preliminary cutting more intuitively by means of various methods like visual, auditory and haptic methods, and the working efficiency can be increased.

Features in the embodiments described above can be appropriately combined with each other.

DESCRIPTION OF REFERENCE CHARACTERS

1: machine tool, 10: processing control device, 11: tool, 100: control unit, 101: CPU, 102: memory, 103: storage device, 104: database, 200: driving unit, 210: main shaft unit, 211: main shaft sensor, 212: main shaft revolution speed control unit, 213: main shaft motor, 220: feeding unit, 221: feeding sensor, 222: feeding speed control unit, 223: feeding motor, 230: pressure sensor, 300: output unit, 302: visual data generation unit, 303: monitor, 304: auditory data generation unit, 305: speaker, 306: haptic data generation unit, 307: vibration actuator, 400: input unit, 401: keyboard, 402: mouse, 403: touch panel.

What is claimed is:

1. A processing control device to control a tool, comprising:
   a driving device to drive the tool according to a control command;
   an output device;
   a controller to control the driving device and the output device; and
   an input device for inputting the control command, wherein
   after preliminary cutting that is cutting processing to be performed on a workpiece on a basis of a preliminary cutting program as the control command is performed before regular cutting processing, the controller generates processing information including a burr position expected to occur on a workpiece in the regular cutting processing, on a basis of stress that occurs when the tool driven by the driving device touches the workpiece cut on a basis of the preliminary cutting program, when a cutting program as the control command for performing the regular cutting processing is inputted from the input device, the controller controls the driving device on a basis of the cutting program, when the controller determines that the regular cutting processing based on the cutting program is completed, the controller transmits the processing information to the output device and accordingly the processing information is outputted from the output device so as to be referred by a user, and when a burr cutting program as the control command for performing burr cutting on a workpiece cut according to the cutting program is inputted from the input device by the user according to the processing information outputted from the output device, the controller controls the driving device according to the burr cutting program.

2. The processing control device according to claim 1, wherein after the preliminary cutting is performed, the controller generates processing information including a cutting error that is expected to occur on a workpiece in the regular cutting processing, on a basis of stress that occurs when the tool driven by the driving device touches the workpiece cut on a basis of the preliminary cutting program.

3. The processing control device according to claim 2, wherein when an error cutting program as the control command for performing cutting processing for correcting the cutting error on a workpiece cut according to the cutting program is inputted from the input device by the user according to the processing information outputted from the output device, the controller controls the driving device according to the error cutting program.

4. The processing control device according to claim 1, the output device includes at least one of a monitor, a speaker, or a vibration actuator to vibrate, and the processing information is outputted from the at least one of the monitor, the speaker, or the vibration actuator.

5. The processing control device according to claim 1, wherein the output device includes a monitor.

6. The processing control device according to claim 5, wherein when the controller determines that the regular cutting processing based on the cutting program is completed, the controller transmits an image of a workpiece obtained by performing the regular cutting processing to the monitor together with the processing information and accordingly the image and the processing information are displayed on the monitor.

7. The processing control device according to claim 1, wherein the controller includes a storage device, and the processing information is stored in the storage device.

8. A machine tool comprising:

a tool; and the processing control device according to claim 1 to control the tool.

9. The machine tool according to claim 8, wherein after the preliminary cutting is performed, the controller generates processing information including a cutting error that is expected to occur on a workpiece in the regular cutting processing, on a basis of stress that occurs when the tool driven by the driving device touches the workpiece cut on a basis of the preliminary cutting program.

10. The machine tool according to claim 9, wherein when an error cutting program as the control command for performing cutting processing for correcting the cutting error on a workpiece cut according to the cutting program is inputted from the input device by the user according to the processing information outputted from the output device, the controller controls the driving device according to the error cutting program.

11. A processing control device to control a tool, comprising:

a driving device to drive the tool according to a control command;

an output device;

a controller to control the driving device and the output device; and an input device for inputting the control command, wherein after preliminary cutting that is cutting processing to be performed on a workpiece on a basis of a preliminary cutting program as the control command is performed before regular cutting processing, the controller generates processing information including a cutting error expected to occur on a workpiece in the regular cutting processing, on a basis of stress that occurs when the tool driven by the driving device touches the workpiece cut on a basis of the preliminary cutting program, when a cutting program as the control command for performing the regular cutting processing is inputted from the input device, the controller controls the driving device on a basis of the cutting program, when the controller determines that the regular cutting processing based on the cutting program is completed, the controller transmits the processing information to the output device and accordingly the processing information is outputted from the output device so as to be referred by a user, and when an error cutting program as the control command for performing cutting processing for correcting the cutting error on a workpiece cut according to the cutting program is inputted from the input device by the user according to the processing information outputted from the output device, the controller controls the driving device according to the error cutting program.

12. The processing control device according to claim 11, wherein after the preliminary cutting is performed, the controller generates processing information including a burr position expected to occur on a workpiece in the regular cutting processing, on a basis of stress that occurs when the tool driven by the driving device touches the workpiece cut on a basis of the preliminary cutting program.

13. The processing control device according to claim 12, wherein when a burr cutting program as the control command for performing burr cutting on a workpiece cut according to the cutting program is inputted from the input device by the user according to the processing information outputted from the output device, the controller controls the driving device according to the burr cutting program.

14. A machine tool comprising:

a tool; and the processing control device according to claim 11 to control the tool.

15. The machine tool according to claim 14, wherein after the preliminary cutting is performed, the controller generates processing information including a burr position expected to occur on a workpiece in the regular cutting processing, on a basis of stress that occurs when the tool driven by the driving device touches the workpiece cut on a basis of the preliminary cutting program.

16. The machine tool according to claim 15, wherein when a burr cutting program as the control command for performing burr cutting on a workpiece cut according to the cutting program is inputted from the input device by the user according to the processing information outputted from the output device, the controller controls the driving device according to the burr cutting program.

17. A processing control method in a processing control device including a driving device to drive a tool according to a control command, an output device, and a controller to control the driving device and the output device, and an input device for inputting the control command, the method comprising:
performing preliminary cutting that is cutting processing to be performed on a workpiece on a basis of a preliminary cutting program as the control command before regular cutting processing;
generating processing information including a burr position expected to occur on a workpiece in the regular cutting processing, on a basis of stress that occurs when the tool driven by the driving device touches the workpiece cut on a basis of the preliminary cutting program;
controlling the driving device on a basis of the cutting program when a cutting program as the control command for performing the regular cutting processing is inputted from the input device;
making the output device output the processing information so as to be referred by a user when the controller determines that the regular cutting processing based on the cutting program is completed; and
controlling the driving device according to a burr cutting program when the burr cutting program as the control command for performing burr cutting on a workpiece cut according to the cutting program is inputted from the input device by the user according to the processing information outputted from the output device.

18. The processing control method according to claim 17, further comprising generating processing information including a cutting error that is expected to occur on a workpiece in the regular cutting processing, on a basis of stress that occurs when the tool driven by the driving device touches the workpiece cut on a basis of the preliminary cutting program, after the preliminary cutting is performed.

19. The processing control method according to claim 18, further comprising controlling the driving device according to an error cutting program when the error cutting program as the control command for performing cutting processing for correcting the cutting error on a workpiece cut according to the cutting program is inputted from the input device by the user according to the processing information outputted from the output device.

20. A processing control method in a processing control device including a driving device to drive a tool according to a control command, an output device, and a controller to control the driving device and the output device, and an input device for inputting the control command, the method comprising:
performing preliminary cutting that is cutting processing to be performed on a workpiece on a basis of a preliminary cutting program as the control command before regular cutting processing;
generating processing information including a cutting error expected to occur on a workpiece in the regular cutting processing, on a basis of stress that occurs when the tool driven by the driving device touches the workpiece cut on a basis of the preliminary cutting program;
controlling the driving device on a basis of the cutting program when a cutting program as the control command for performing the regular cutting processing is inputted from the input device;
making the output device output the processing information so as to be referred by a user when the controller determines that the regular cutting processing based on the cutting program is completed; and
controlling the driving device according to an error cutting program when the error cutting program as the control command for performing cutting processing for correcting the cutting error on a workpiece cut according to the cutting program is inputted from the input device by the user according to the processing information outputted from the output device.

21. The processing control method according to claim 20, further comprising generating processing information including a burr position expected to occur on a workpiece in the regular cutting processing, on a basis of stress that occurs when the tool driven by the driving device touches the workpiece cut on a basis of the preliminary cutting program, after the preliminary cutting is performed.

22. The processing control method according to claim 21, further comprising controlling the driving device according to a burr cutting program when the burr cutting program as the control command for performing burr cutting on a workpiece cut according to the cutting program is inputted from the input device by the user according to the processing information outputted from the output device.

* * * * *